(12) United States Patent
Marvasti et al.

(10) Patent No.: US 8,275,563 B2
(45) Date of Patent: Sep. 25, 2012

(54) NONPARAMETRIC METHOD FOR DETERMINATION OF ANOMALOUS EVENT STATES IN COMPLEX SYSTEMS EXHIBITING NON-STATIONARITY

(75) Inventors: Mazda A. Marvasti, Coto de Caza, CA (US); Daniel R. Jeske, Riverside, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/976,586

(22) Filed: Dec. 22, 2010

(65) Prior Publication Data

US 2011/0119029 A1 May 19, 2011

Related U.S. Application Data

(63) Continuation of application No. 12/619,601, filed on Nov. 16, 2009, now Pat. No. 7,869,967, which is a continuation of application No. 11/742,479, filed on Apr. 30, 2007, now Pat. No. 7,620,523.

(51) Int. Cl.
*G01N 37/00* (2006.01)
*G08B 21/00* (2006.01)

(52) U.S. Cl. ......................................... 702/83; 340/679

(58) Field of Classification Search ................ 702/83, 702/1, 33–34, 127, 179, 182–187, 189–191, 702/193–194; 703/2, 17, 22; 705/5–6, 22, 705/28, 36 R; 708/200–202, 207, 250; 726/22–23, 726/25; 340/500, 540, 679–680
See application file for complete search history.

(56) References Cited

U.S. PATENT DOCUMENTS

| | | | |
|---|---|---|---|
| 7,620,523 B2 * | 11/2009 | Marvasti et al. | 702/183 |
| 7,869,967 B2 * | 1/2011 | Marvasti et al. | 702/83 |
| 2005/0249214 A1 | 11/2005 | Peng | |
| 2008/0270071 A1 * | 10/2008 | Marvasti et al. | 702/179 |

OTHER PUBLICATIONS

Cardenas et al., Distribued Change Detection for Worms, DDoS and other Network Attacks, Jun. 30-Jul. 2, 2004, Proceeding of the 2004 American Control Conference, pp. 1008-1013.*

* cited by examiner

*Primary Examiner* — Toan M Le

(57) ABSTRACT

According to a feature of the present disclosure, a method is provided for the determination of anomalous events in complex systems, such as problems, inefficiencies, and failures, and a tool is provided for the detection of these events. Many complex systems are non-stationary or experience periodic fluctuations or spikes in values that are outside of normal ranges, but constitute normal behavior nevertheless. The method accounts for both non-stationarity, as well as fluctuations and spikes. Additional novel features include both a threshold setting initialization method and a regression method for the determination of the start points and end points of events.

20 Claims, 10 Drawing Sheets

| METRIC | MONITOR WEEKS | TRACKING STATISTIC | THRESHOLD VALUE | | ALARM SUMMARY | | |
|---|---|---|---|---|---|---|---|
| | | | MIN | MAX | TOTAL OR ALARMS MONITORING PERIOD | AVG. DURATION (OBS.) (MIN.) | AVG. DETECT (OBS.) (MIN.) |
| LIVE SESSIONS | 9 | MAX{$S_n^+, S_n^-$} | 1315 | 3264 | 19 | 91 182 | 28 56 |
| ORACLE SESSIONS | 14 | MAX{$S_n^+, S_n^-$} | 338 | 836 | 21 | 56 280 | 13 65 |
| 1 | 2 | 3 | 4 | 5 | 6 | 7 | 8 |

NONPARAMETRIC METHOD FOR DETERMINATION OF ANOMALOUS EVENT STATES IN COMPLEX SYSTEMS EXHIBITING NON-STATIONARITY

RELATED APPLICATIONS

This application is a continuation of and claims the priority of U.S. patent application Ser. No. 12/619,601, filed Nov. 16, 2009, now U.S. Pat. No. 7,869,967, which claims the priority of U.S. patent application Ser. No. 11/742,479, now U.S. Pat. No. 7,620,523, filed Apr. 30, 2007, the contents of which are both hereby incorporated by reference.

BACKGROUND

Processes that occur over time are frequently monitored for change by metrics that are sampled on a periodic basis. It is often of interest to compare the level of the process to a specified target value. In other cases, the range of the process may be of interest. Implicitly, the observer of the data is using the measurements to determine if the process is behaving as expected, or alternatively, if there has been some kind of change that would indicate the process is behaving abnormally. In the latter case, the detected change could be used to trigger an alert state and initiate an in-depth root cause analysis. If a root cause is identified, a valuable corrective action could be taken. The worst case is that no root cause is found and the process measurements begin to look normal again. While there is an inconvenience associated with occasional false positive alert states, it is usually far outweighed by the benefit that comes along with early identification of true positive alert states.

Algorithms that take sequences of observations as input and return alerts that indicate a change in the process based on unusual trends or patterns in recent data are called change-point detection algorithms. Application of change-point detection algorithms have proliferated into many fields beyond their initial use in manufacturing and engineering disciplines. Illustrative examples include medical applications, for example, the effect of a stimulus on neuron behavior, heart beat variability during sleep, and detection of disease outbreaks. Other applications include, for example, distinguishing between seismicity levels, detection of cellular fraud, detection of variance changes in stock prices, special problems in hydrology, and applications related to network security and network activity.

A familiar change-point algorithm is the classic cumulative sum (cusum) algorithm which accumulates deviations (relative to a specified target) of incoming measurements and issues alerts when the cumulative sum gets too large. Commonly, the process is normally distributed with a known mean and standard deviation. Classic cusum algorithms are generally designed to detect shifts away from a targeted mean.

There is a need to adapt the classic cusum change-point detection algorithm for complex applications in systems monitoring where various and numerous performance and reliability metrics are available to aid with early identification of realized or impending problems and failures. Specifically, the inventors have solved this need by overcoming three significant challenges: 1) the need for a nonparametric technique so that a wide variety of metrics (including discrete metrics) may be included in the monitoring process, 2) the need to handle time varying distributions for the metrics that reflect natural cycles for non-stationary data sets, and 3) the need to be computationally efficient with the massive amounts of data that are available for processing. The present disclosure provides a solution including a screening feature that fully automates the implementation of the algorithm and eliminates the need for manual oversight up until the point where identification of an anomalous event is necessary.

SUMMARY

According to a feature of the present disclosure, a method is provided for the determination of anomalous events in complex systems, such as problems, inefficiencies, and failures, and a tool is provided for the detection of the events. Many complex systems are non-stationary or experience periodic fluctuations or spikes in values that are outside of normal ranges, but constitute normal behavior nevertheless. The method accounts for both non-stationarity as well as fluctuations and spikes. Additional novel features include both a threshold setting initialization method and a regression method for the determination of the start points and end points of events.

Also according to a feature of the present disclosure, a method for determining the end point of an anomalous event in an IT infrastructure is disclosed comprising in the IT infrastructure, measuring and collecting data for a metric; obtaining a cusum value for the metric over a series of time periods; obtaining a linear regression of cusum values for a set of v time periods; if the slope of linear regression is positive, increasing v by w (v=v+w) and obtaining a linear regression for the new time interval and repeating until the regression slope is negative; when the regression slope is negative, finding the largest cusum value in the set of v historical cusum values and designating the time period corresponding to the largest cusum value in the set of v historical cusum values as the end point of the anomalous event. Regressions over v cusum values begins at the first cusum statistic to exceed the threshold and progresses for each cusum statistic thereafter until a negative or flat slope is calculated.

According to a feature of the present disclosure, a method for determining the start point of an anomalous event in an IT infrastructure is disclosed comprising in the IT infrastructure, measuring and collecting data for a metric; obtaining a cusum value for the metric over a series of time periods; determining an end point for the anomalous event; obtaining a linear regression for a set of v time periods consisting of the time period corresponding with the end point of the anomalous event and the v−1 time periods prior to the time period corresponding with the end point; if the slope of linear regression is positive, decreasing v by w (v=v−w) and obtaining a linear regression for the new time interval and repeating until the regression slope is negative; and when the regression slope is negative, assigning one of the time periods in the v time periods to be the starting point of the anomalous event.

DRAWINGS

The above-mentioned features and objects of the present disclosure will become more apparent with reference to the following description taken in conjunction with the accompanying drawings wherein like reference numerals denote like elements and in which:

FIG. 10 is a table illustrating a summary of generalized cusum algorithm output during monitoring periods for an exemplary embodiment of the present disclosure.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. As used in the present disclosure, the term "or" shall be understood to be defined as a logical disjunction and shall not indicate an exclusive disjunction unless expressly indicated as such or notated as "xor."

The inventors have modified the classic cusum algorithm so that it can be extended to be used for monitoring and predicting problem states in complex systems, having various and numerous reliability and performance metrics available to provide information about realized or impending abnormal events, defined as problems, inefficiencies and failures. For example, in data network contexts identification of hardware failures, software failures, and procedural errors is a primary concern. Illustrative metrics that are often available from individual network elements include traffic throughput (e.g., packets per second or counts of users), memory usage, active CPU time, and delay measurements. According to a feature of the present solution, observations within each of a defined structure of timeslots are independent and identically distributed within a sliding window of time.

A significant challenge in many complex systems to which the present disclosure is applicable, such as in data network monitoring contexts, is that the observed data is non-stationary. Non-stationary data is data exhibiting significant variations or trends in behavior at different times. For example, traffic on data networks often exhibits a natural weekly cycle, with weekdays being pronouncedly different from weekend days. Moreover, the hours within a day vary significantly according to traditional work schedules in a networking context. Airline and hotel reservation systems similarly exhibit this type of non-stationary behavior, with summers and holidays showings increased travel traffic over other periods. Likewise, hotels serving business districts may have occupancy variations patterns corresponding peeking during the work week with the lowest occupancy on Saturday and Sunday nights, for example. Artisans will recognize other data sets in complex systems exhibiting non-stationarity.

Figure 1:
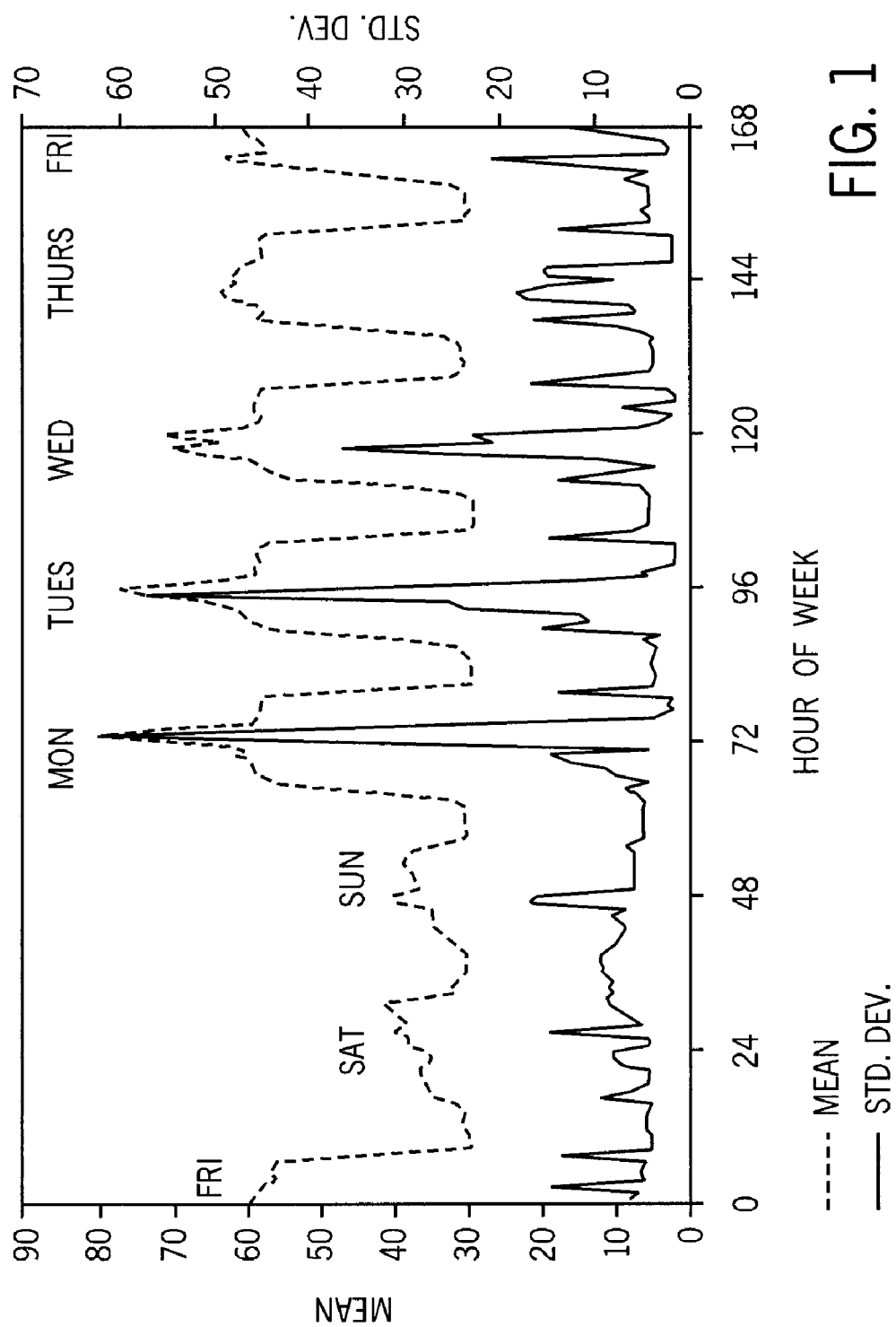
FIG. 1 is a graph illustrating an embodiment of the present disclosure of data showing non-stationarity of a particular data metric over the course of a week.

FIG. 1 illustrates an embodiment of non-stationary data for which the methods of the present disclosure are useful. Prediction of events are detected irrespective of the day and taking into account the variations in behavior from day to day and hour to hour, for example. FIG. 1 is illustrative of the variability in the number of live user sessions on a network server across the hours in a week. The means and standard deviations are estimated from a 12-week snapshot of live user counts that were collected every two minutes. Besides temporal variation, the topology of a network is dynamic in the sense it transitions through change-management reconfigurations, upgrades, and expansions according to user-demands and network evolution activities. Inherent "network churn" is a significant complicating factor.

Importantly, FIG. 1 illustrates the "usage" problem inherent in analyzing the networks. That is, usage on weekdays is much greater than weekend usage. In FIG. 1, 24 and 48 hours represent Saturday and Sunday respectively. Looking at the mean usage for the number of live sessions, the weekend days show roughly a third of the number of user sessions than those of an average weekday, represented by hours 72, 96, 130, 144, and 168.

Another challenge in analyzing complex systems is the need to avoid use of parametric distribution assumptions. Even within relatively homogenous time periods, experience shows that common parametric distribution families do not describe the variation in a data stream consistently enough to be reliable over long term use. It is simply not tenable to constantly check and modify the distribution assumptions being made for each of the numerous data streams.

Finally, reliability and performance metrics are collected frequently. It is not uncommon, for example, to have measurements collected every minute. Even in small data networks, for example, the number of monitored entities (e.g., hardware devices, communication links, and software entities) can number in the hundreds, and the analysis of frequent measurements on multiple metrics across all of the entities quickly develops into a massive data mining problem. Even with state-of-the-art graphical user-interface support, it is not tenable to have human oversight of so many data streams. In larger networks, the massive data processing and interpretation needs compound exponentially. Handling the stringent computing demands efficiently and in a fully automated way is a significant challenge.

Figure 2:
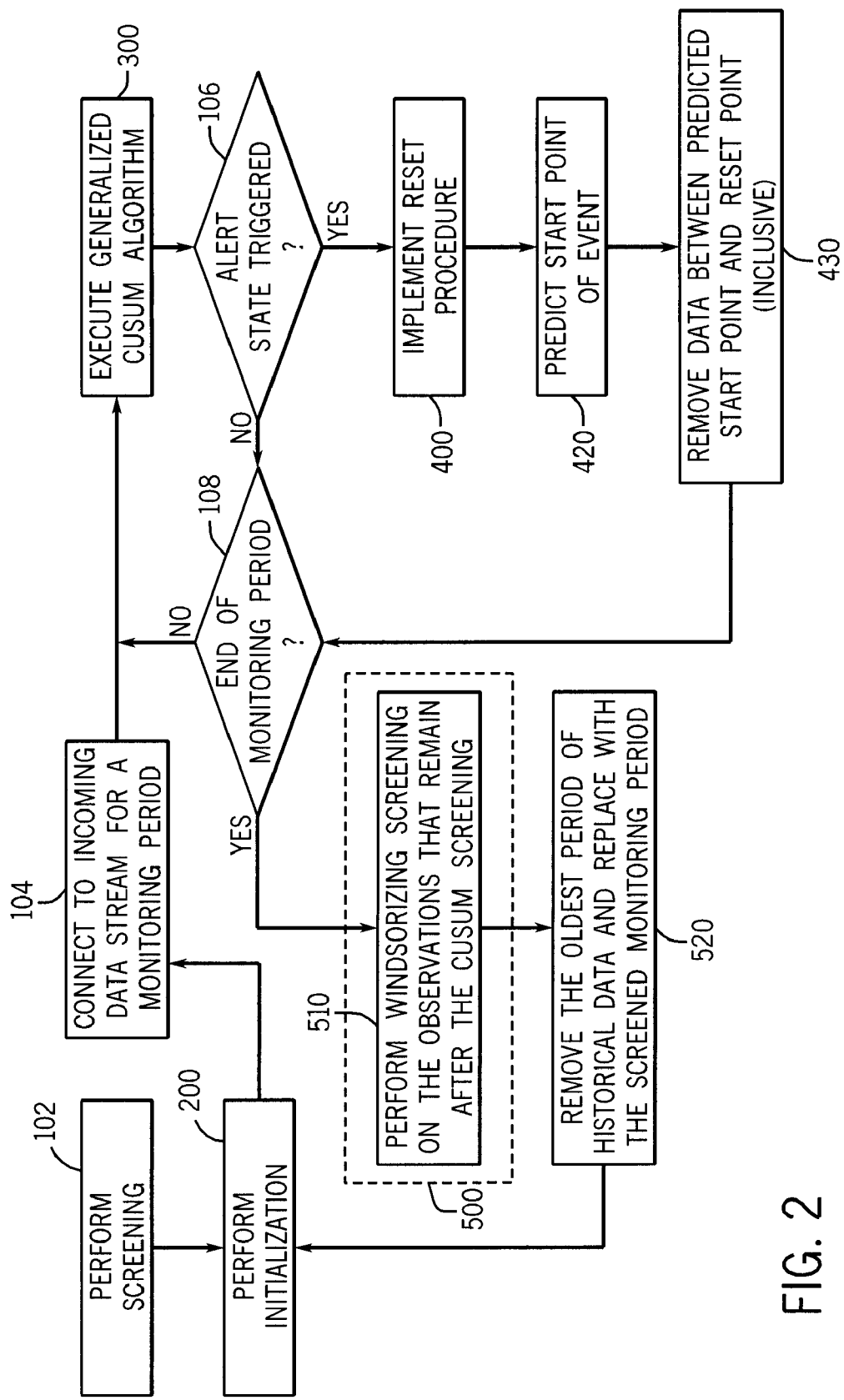
FIG. 2 is a flow diagram of an embodiment of the on-line screening procedure that creates the most recent window of historical data for the purpose of computing the a cusum threshold.

According to an embodiment shown in FIG. 2, a non-parametric method is disclosed for identifying abnormal events in complex systems having non-stationary data. Prior to deployment, and during deployment in an on-line fashion, screening is performed in operation 102 on a set of historical data to remove abnormal events and optionally unwanted outliers in the historical data set. The system is initialized in operation 200 using the screened set of historical data. Initialization sets thresholds to which the cusum statistics are compared. The thresholds are set to a given level of permitted deviation from predicted or average metric values. After initialization is complete, the system is ready to analyze incoming data in real time by connecting to an incoming stream of data for a given monitoring period in operation 104 (e.g., an hour, a week, etc.).

A monitoring period is period of time where data patterns are more or less consistent from monitoring period to monitoring period. A monitoring period may be a day, week, month, or any period of time according to embodiments. According to other embodiments, a monitoring period may be an airline flight or nine innings of a baseball game. According to still other embodiments, a monitoring period may be an arbitrary division of a measuring interval or technique that exhibits some pattern of repeatability. Artisans will readily understand that different monitoring periods may be selected on a metric by metric basis, provided a level of consistency is observed to allow meaning full results using the instant teachings.

In one embodiment, each monitoring period is divided into timeslots, which represent the lowest level of granularity of the present disclosure. For a monitoring period defined to be a week, each timeslot may be 1 hour, for a total of 168 timeslots per week. The timeslot for the airline flight may be defined at 12-hour increments for 6 months leading up to the flight. The exact definition of a timeslot may be defined on a metric by metric basis. Each timeslot obtains values of the metric at least once. For metrics such as network usage where a timeslot is an hour, metrics may be polled every minute providing 60 data points per timeslot, according to embodiments.

Incoming data is analyzed using the cusum algorithm described in operation 300. According to one embodiment of the present method, after executing the cusum algorithm, if the cusum statistic is determined to exceed threshold set in the initialization stage in operation 106, an alert state is triggered. However, if no alert state is triggered and a determination is made in operation 108 that the end of the time period has not yet occurred, the next observation of incoming data is analyzed with the cusum algorithm as disclosed in operation 300.

However, if an alert state is detected in operation 106, the alert state is used to perform a root cause analysis in an attempt to determine the source and reasons for the abnormal event. After an alert state is activated, a reset procedure is implemented in operation 400, wherein the end point of the event is determined and the cusum statistic is reset. The start point of the event of the event is also determined in operation 420. After the reset procedure in operation 400 and start point in operation 420, is complete, the event data is purged from the set of data for the monitoring period in operation 440 so as not to foul reinitialization procedures in operation 200.

At the end of the monitoring period in operation 108, secondary screening in operation 500 occurs to update the relevant thresholds according to evolving conditions. Thus, according to certain embodiments, the methods taught herein anticipate and account for evolution of the circumstances of the data which provides a desirable sensitivity within the methods that allows the system to be fine-tuned to minimize the number of false positive or false negative results produced. For example, as travel patterns increase during the summer months and holidays, the relevant thresholds automatically adjust so that the increased traffic is not flagged as abnormal.

Generally, the data set for the monitoring period that has just ended is appended to the set of historical initialization data. Likewise, the oldest monitoring period of data is removed from the set of initialization data in operation 520. According to embodiments, monitoring period data may be weighted so that the most recent data is more influential in the determination of new thresholds than the data of older monitoring periods. According to embodiments, the incoming monitoring period of data may be windsorized in operation 510 to remove outliers that would otherwise skew the new thresholds determined in the reinitialization process in secondary screening operation 500. After the set of initialization data is updated, reinitialization occurs in operation 200, whereby new thresholds are computed and the system is again ready to receive incoming data in operation 104.

Cusum Algorithm

In one aspect, an improved generalized cusum algorithm is disclosed that accounts for non-stationary data. Each cusum statistic is compared to a predetermined threshold to determine whether to initiate an alert state. According to an embodiment, the improved generalized cusum algorithm may be defined as:

$$S_n^+ = \max\{0, S_{n-1}^+ + Y_n - Q_{\tau_n}(\alpha)\}$$

$$S_n^- = \max\{0, S_{n-1}^- + Q_{\tau_n}(1-\alpha) - Y_n\}$$

where $S_n^+$ and $S_n^-$ represent cusum statistics for the current or most recent timeslot, $S_{n-1}^+$ and $S_{n-1}^-$ are the cusum statistics from the immediately previous timeslot, $Y_n$ represents the value of an incoming metric from a data stream for the current timeslot or most recent timeslot, and $Q_{\tau_n}(\alpha)$ and $Q_{\tau_n}(1-\alpha)$ are upper and lower α-percentiles defining a range of normal values for the incoming $Y_n$ for a given timeslot $\tau_n$. According to embodiments, the algorithm may comprise one or more cusum statistics; if any of the cusum statistic values exceed a relevant threshold, an alert state is initiated. According to similar embodiments, one or more disparate thresholds may be computed, each for one or more cusum statistics to allow different levels of permitted deviation from normal values. Algorithms having two cusum statistics are considered two-way and the present disclosure is equally useful in a one-way algorithm which has only a cusum statistic $S_n$. Algorithms with greater than two cusum statistics are also possible. Generally, each cusum statistic will have at least one threshold to which it is compared; each threshold will similarly have at least one cusum statistic compared to it.

Figure 3:
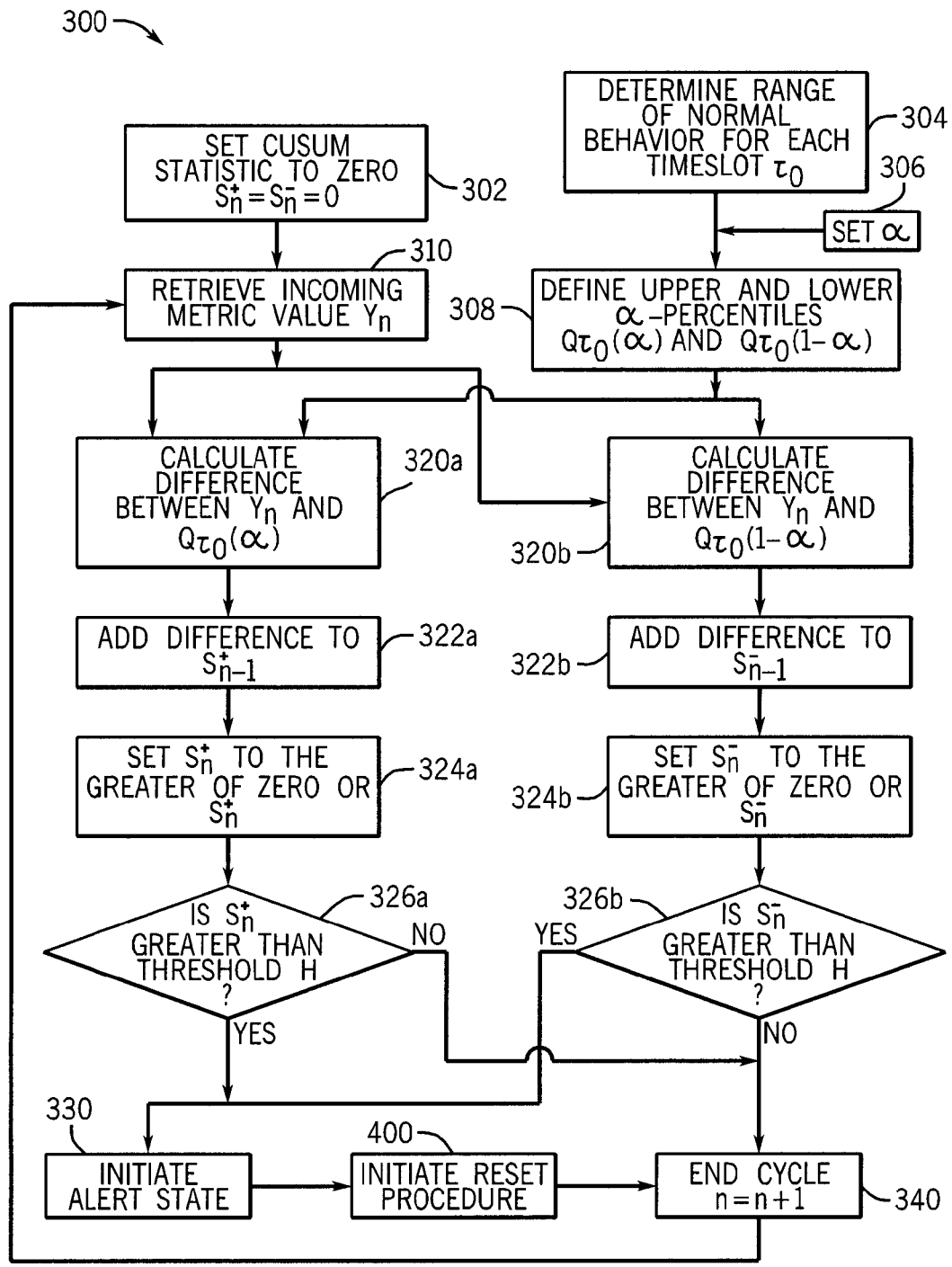
FIG. 3 is a flow diagram of an embodiment of the cusum algorithm of the present disclosure that will produce a statistic to be compared to a threshold and initiate an alert state if the threshold is exceeded.

FIG. 3 is a flow diagram illustrating an embodiment of the improved cusum analysis methods of the present disclosure. After initialization operation 200 (FIG. 2) wherein historical data is used to generate relevant thresholds for the cusum statistics and connection to an incoming data source 104 is effected, each cusum statistic is set to a starting state, for example zero in operation 302 ($S_n^+ = S_n^- = 0$).

Using historical data, a range of acceptable behavior is determined for a metric for each timeslot $\tau_n$ in operation 304 represented by $Q(\alpha)$ and $Q(1-\alpha)$, which are α-percentiles of normal metric behavior. The acceptable behavior defines normal parameters for a metric at the given timeslot. For example, referring again to FIG. 1, the number of live sessions for a Saturday or Sunday would generally be between 30 and 40 during the daytime. However, during the daytime hours on a Monday, the normal range for the number of live sessions is between 30 and 80. A metric reporting 80 live sessions for a Monday would be normal; a metric reporting 80 live sessions on a Saturday or a Tuesday is abnormal for that timeslot and an indication that a problem may exist. Thus, historical data is the basis upon which the value of each incoming metric is compared. The historical data is used to determine the range of normality of a given metric on a timeslot by timeslot basis, to reflect the variations in metric behavior from timeslot to timeslot considered to be normal.

Similarly, historical data could suggest, under normal conditions, that a minimum of at least 30 sessions should always exist. Two cusum statistics could therefore be used.

Referring again to the exemplary cusum algorithm and the flow diagram of FIG. 3, after a range of normal values are determined for a statistic for each timeslot in a monitoring period, upper and lower α-percentiles are defined for the range of normal values in operation 308. It is used, according to embodiments, to define the magnitude of departure from previous norms that is considered a serious deviation. As the cusum algorithm of the present disclosure seeks to detect sustained periods of outliers relative to normal values, the upper and lower α-percentiles represent a statistically significant point where a metric value is considered to be an outlier. Alpha (α) is a tunable parameter in operation 306 determining the level of statistical significance desired in the range of normal values.

For example, a may be set to 0.025 so that a metric value that is outside of 95% confidence, would be considered to be an outlier and not deemed as normal. Recall that the α-parameter defines in $Q_{\tau_n}(\alpha)$ and $Q_{\tau_n}(1-\alpha)$ a range of normal values for a metric.

For the exemplary cusum algorithm proposed herein, each timeslot will have an upper and lower α-percentile determined, represented by $Q_{\tau_n}(\alpha)$ and $Q_{\tau_n}(1-\alpha)$ in operation 308. Artisans will readily recognize that $Q_{\tau_n}(\alpha)$ defines an upper limit of normal values of a metric, whereas $Q_{\tau_n}(1-\alpha)$ defines a lower limit of normal values of a metric.

From the incoming data stream, an incoming metric value $Y_n$ for a timeslot is obtained in operation 310. The cusum statistic is determined by a series of steps in operations 320a-324a, 320b-324b. The first step in the calculation of the cusum statistic is to determine the difference between the actual value of the metric $Y_n$ and each α-percentile $Q_{\tau_n}(\alpha)$ and $Q_{\tau_n}(1-\alpha)$ in operations 320a, 320b. Naturally, according to embodiments, only a single difference will be determined where only a single cusum statistic is computed. The value of the difference, according to embodiments, may either be positive or negative; if negative, the value of the metric will fall within $Q_{\tau_n}(\alpha)$ and $Q_{\tau_n}(1-\alpha)$, and if positive, the value of the metric will fall outside of the $Q_{\tau_n}(\alpha)$ and $Q_{\tau_n}(1-\alpha)$ range.

The result of the difference between $Y_n$ and each α-percentile $Q_{\tau_n}(\alpha)$ and $Q_{\tau_n}(1-\alpha)$ is added to the value of the cusum statistic carried over from the immediately previous metric observation $S_{n-1}^+$, and $S_{n-1}^-$ in a two-way cusum algorithm in operations 322a, 322b. In a one-way cusum algorithm, there will be only a single cusum statistic, for example $S_{n-1}^+$ to which the single difference between $Y_n$ and α-percentile $Q_{\tau_n}(\alpha)$ is added. The cusum value for the next iteration will retain its value if its value is positive after adding the difference between the value of the metric $Y_n$ and the relevant α-percentile or be set to zero if it is negative after adding the difference in operations 324a, 324b. Artisans will recognize that $Q_{\tau_n}(\alpha)$ and $Q_{\tau_n}(1-\alpha)$ will retain the same value for many metric observations in a timeslot where multiple observations are collected for each timeslot.

Artisans will recognize that the cusum statistic may fluctuate up or down depending the behavior of the incoming metric value $Y_n$. If $Y_n$ is well within normal operating parameters, $Y_2$ will be between the range defined by $Q_{\tau_n}(\alpha)$ and $Q_{\tau_n}(1-\alpha)$ and therefore the difference will be negative, which will lower the value of the cusum statistic carried over into the next iteration. If $Y_n$ is outside of normal operating parameters, the difference between $Y_n$ and $Q_{\tau_n}(\alpha)$ will be positive, which will cause the cusum value to increase. After the cusum value is determined, it is compared to a threshold H in operations 326a, 326b for $S_n^+$ and $S_n^-$, respectively. The threshold H measures a level of deviation from the normal that is indicative of sufficient deviation from normal operation to declare an alert state.

If the cusum value does not exceed the relevant threshold, the iteration ends and n is recalculated for the next iteration (n=n+1) in operation 340 and the next incoming metric value $Y_n$ is retrieved for the next iteration in operation 310.

However, if the cusum value exceeds a relevant threshold, an alert state is initiated in operation 330. An alert state allows measures to be taken to determine the root cause of the putative abnormal event and take appropriate steps. Upon initializing an alert state, a reset procedure is initiated in operation 400 to determine the end point of the abnormal event and reset the cusum statistic that triggered the alert state to preclude false alert states triggered because the cusum statistic remains above a relevant threshold once normal behavior resumes, as described below. Therefore, the next incoming metric is retrieved in operation 310 commencing the next iteration.

Figure 4:
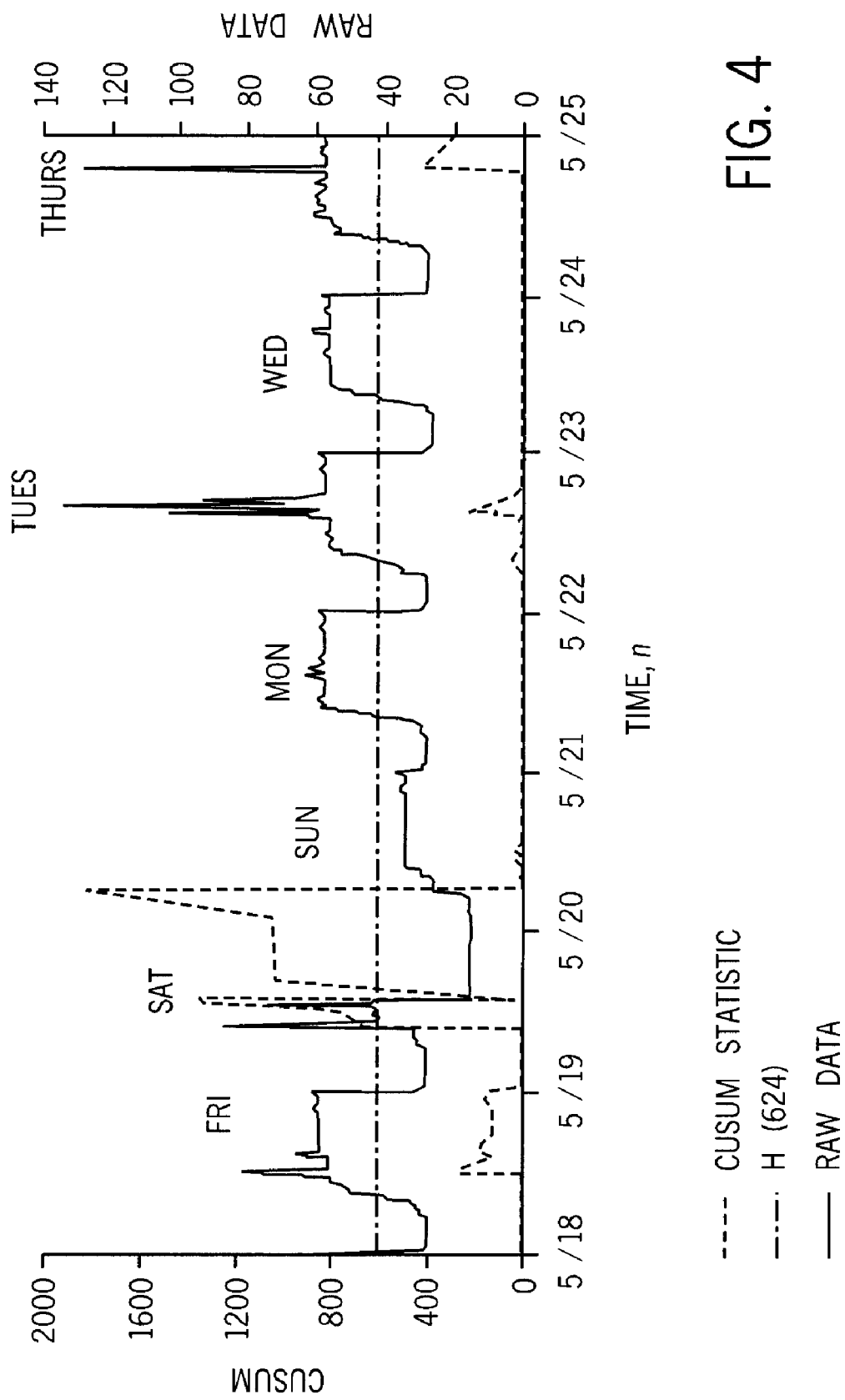
FIG. 4 is a graph illustrating an exemplary embodiment of an application of the cusum algorithm of the present disclosure to a set of incoming metric data that triggers an alert state.

According to an exemplary embodiment shown in FIG. 4, there is illustrated a graph demonstrating the features of a two-way algorithm with cusum statistics of $S_n^+$ and $S_n^-$ and threshold H (the horizontal line in FIG. 2 corresponding to cusum statistic value in operation 624). As will readily be observed from the raw data of user database sessions illustrates, a typical work week is shown starting with Friday and ending on Thursday. Each workday (Monday to Friday) approximately 60 database sessions exist on average. For the exemplary week of May 18 through May 25, spikes and fluctuations are observed on May 22, which is expected and constitutes normal behavior and are not necessarily indicative of an abnormal event. As explained previously, the cusum statistic is intended to detect sustained periods of outliers relative to normal behavior in a given timeslot, which allows for periodic spikes and dips that are expected in certain contexts such as database sessions and network usage, for example.

Referring to the May 22 data again the spikes observed in the raw data indicate a number of additional sessions, up to around 135 sessions, above the average. For an alert state to trigger, however, the cusum statistic $S_n^+$ must rise above the threshold H. The cusum statistic $S_n^+$ stays relatively small throughout the time period in which the spikes are observed. The relatively low $S_n^+$ value is due to a higher value of the α-percentile $Q_{\tau_n}(\alpha)$ during the period in which the spike is observed.

For example, suppose at time $k_o$ in timeslot τ, the time immediately prior to the first spike, the cusum statistic $S_{k_0}^+=0$. As the first spike occurs at time $k_1$, the cusum statistic rises by the difference between the value of the spike and $Q_{\tau_n}(\alpha)$. Assume $Q_\tau(\alpha)=59$ and $Y_{k_1}=110$. Then, the cusum statistic for time $k_1$ is calculated as follows: $S_{k_1}^+=\max\{0,S_{k_0}^++Y_{k_1}-Q_{\tau_n}(\alpha)\}=\max\{0,0+110-59\}=\max\{0,51\}=51$. Assume at time $k_2$, the raw value drops to 58 ($Y_{k_2}=58$). Then for time $k_2$, $S_{k_2}^+=\max\{0,51+58-59\}=50$. Assume at time $k_3$ that $Y_{k_3}=138$. If $Q_{\tau_{k_2}}(\alpha)=59$, then $S_{k_3}=\max\{0,50+138-59\}=129$, and so forth. Where no spikes are observed, the cusum statistic eventually will drop to zero because the spikes were not observed for a long enough period of time to trigger an alert state. Indeed, by allowing the cusum statistic to rise and fall, the methods of the present disclosure provide a sensitive way to allow for periodic and normal spikes without triggering alert states, but trigger alert states when the values are out of normal range for a long enough period.

Severe spikes and trends trigger the alert state more rapidly, which would be expected in various situations. For example, if the number of database users spikes to 1,200, where the expected values are around 60, an alert will be triggered at the same n time as the spike occurs.

Provided the cusum statistic remains below H, no alert state will be triggered. However, as observed on May 19 of FIG. 4, an alert state is triggered because the cusum statistic exceeds threshold H. Two observations should be noted: first, the cusum statistic rises quickly despite many less database sessions exists on May 19 when compared to May 22 because the spikes deviate more from the normal or expected values than those on May 22. Second, the below average number of sessions observed on May 20 also causes the cusum statistic $S_n^-$ to exceed the threshold. Intuitively, according to the exemplary embodiment shown in FIG. 4, if $S_n^-$ is a large enough value to exceed the threshold, then $S_n^+$ will be a low number owing the number of below average $Y_n$ values, which tends to reduce the $S_n^+$ cusum statistic over time. Naturally, in a two-way cusum algorithm the reverse is true as well.

Figure 5:
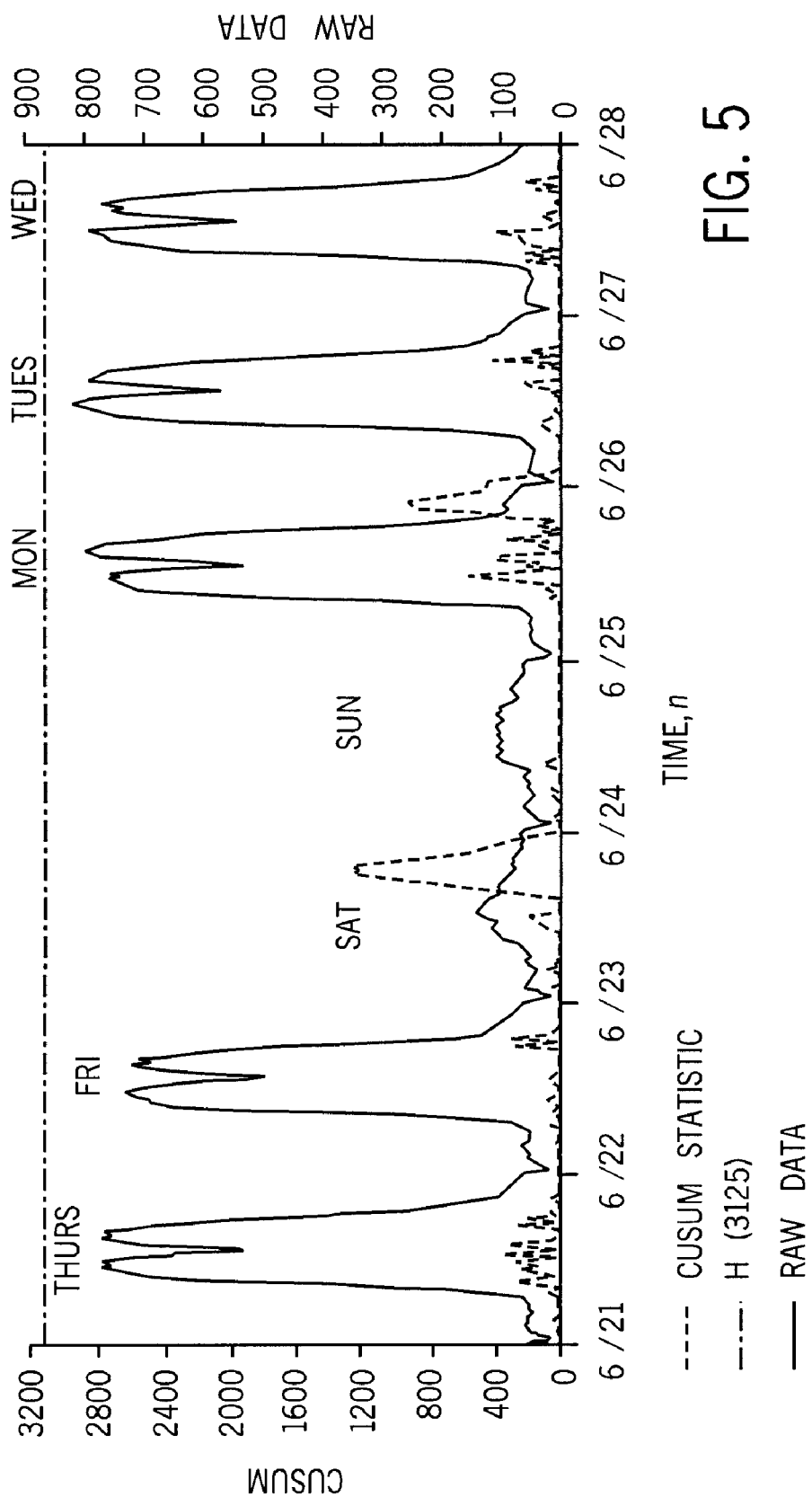
FIG. 5 is a graph illustrating an exemplary embodiment of the present disclosure of an application of the cusum algorithm of the present disclosure to a set of incoming metric data that does not trigger an alert state.

FIG. 5 shows an embodiment using a one-way cusum statistic $S_n^+$. The raw data shows live sessions of network activity. System administrators may decide, for example, that zero live sessions are not indicative of a problem state or failure, according to an embodiment. As with the prior examples, the 5 general peaks represent work days Monday through Friday shown on graph, and the smaller peaks on June 23 and June 24 are Saturday and Sunday respectively. In this case, the threshold H is set at a value of just under 3200. Artisans will readily recognize the lack of a relationship between the raw data values and the cusum statistic values. Indeed, by placing the threshold towards the top of the graph, the resolution of cusum behavior is readily observed in better detail. Accordingly, no alert state is initiated in the monitor period shown the graph of FIG. 5, although the cusum statistic varies over time, most notably on the Saturday evening of June 23 and the Monday evening of June 25.

In one aspect, the above procedure depends on a continuous stream of incoming data. Prolonged periods of missing data are therefore problematic. Conceivably, data may be omitted over time due to clock offsets and communications problems. Such prolonged periods of missing data may be recognized independently as a failure and therefore addressed through independent channels.

However, if a metric observation for time n is not received at the expected time, according to an embodiment, the implementation will wait until the expected time of arrival for the metric observation in the n+1 iteration. If no observation arrives prior to the expected time for the arrival of the metric observation in the n+1 iteration, then the incoming metric observation at n+1 is interpreted as the n+1 observation and the current observation is interpreted as missing. When an observation is interpreted as missing, the cusum statistic from the prior time n is carried forward and the time index n is increased by 1.

If during the period between the expected time for the current observation and that of the n+1 next time, a metric observation is received, it is interpreted as a late metric observation for the time and the cusum calculations are carried out as normal. If two metric observations arrive during the time between the expected time of arrival in the n iteration and that of the n+1 iteration, the first is interpreted as the observation value for the n iteration.

Reset Procedure

An alert state occurs whenever a cusum statistic exceeds its relevant threshold. The alert state initiates a root cause analysis by another party to determine the cause of the alert state, which helps to isolate and correct the causes of abnormal events in the complex system being monitored. However, once the abnormal event is addressed and corrected, the cusum statistic triggering the alert state must be reset to avoid false alert states resulting from the cusum statistic remaining near or exceeding the relevant threshold, as shown in FIG. 6 at $S_{16}^+$.

According to embodiments, to reset the cusum statistic, the end point of the abnormal event is determined. Because the cusum statistic monitors abnormalities over time and may not trigger an alert state in the same timeslot that it actually begins, there is disclosed a method of determining the end point of the abnormal event.

Figure 6:
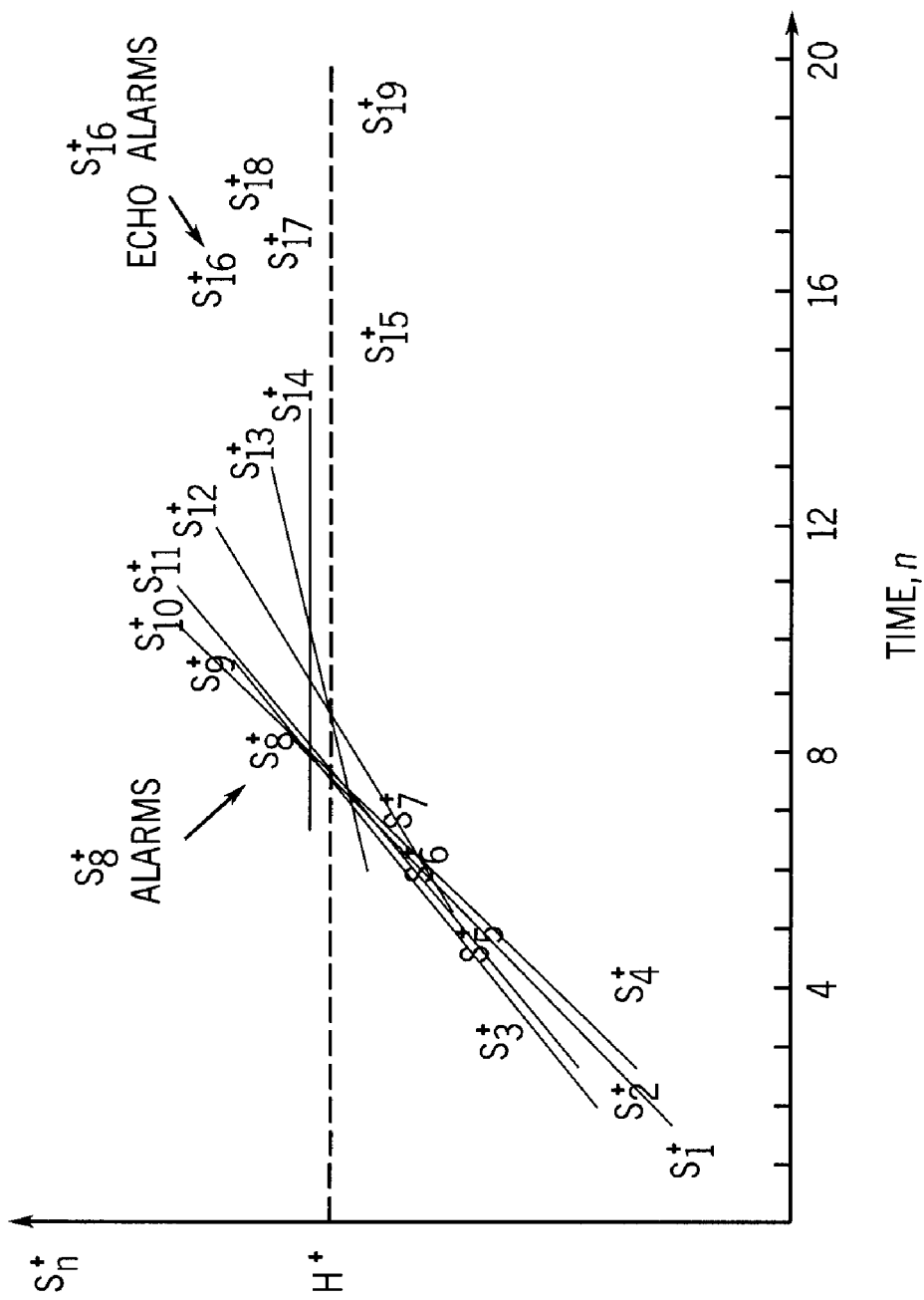
FIG. 6 is a graph illustrating an embodiment of the present disclosure of a procedure for determining the end point of an event using a regression algorithm.

Turing again to cusum statistics shown in FIG. 6, assume that at the timeslot corresponding to cusum statistic $S_4^+$ the abnormal event begins. For the next 4 time periods, the system is in an unalerted state despite the ongoing problem. At time n=8, the threshold H is exceeded and an alert state is initiated. At time n=11, the maximum cusum statistic $S_{11}^+$ is observed and the cusum statistics thereafter begin to decrease at each time until time n=15.

Assume at time n=16 the abnormal event has been resolved and normal behavior is ongoing. However, a spike occurs at time n=16, which causes the cusum statistic to exceed threshold H. However, as previously described, in many complex systems, temporary spikes constitute normal and expected behavior. Thus, if the cusum statistic is not reset as shown in FIG. 6, undesirable false echo alert states may be initiated due to normal and expected behavior of the complex system.

Figure 7:
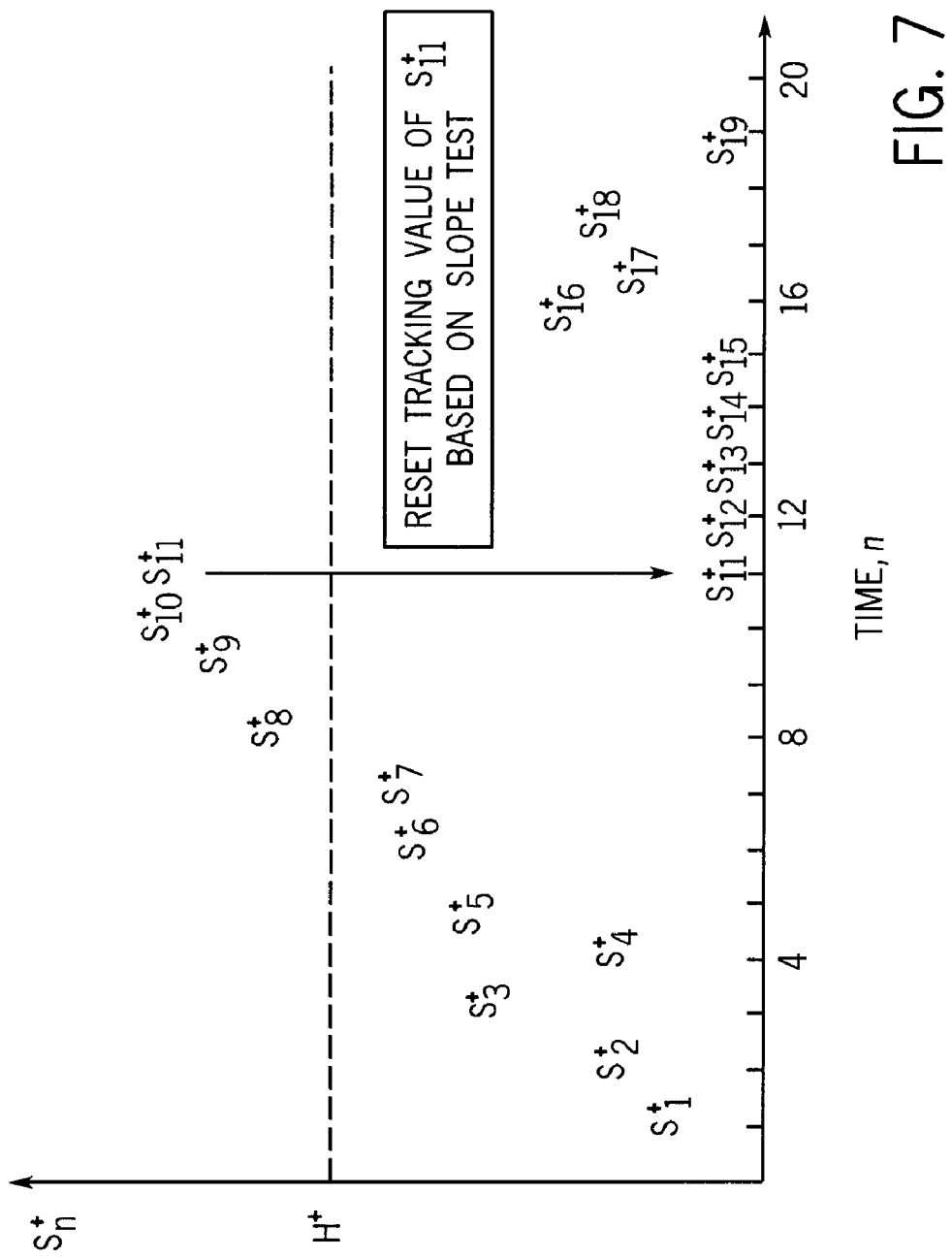
FIG. 7 is a graph illustrating an embodiment of the present disclosure of the effect of a reset of the downstream cusum statistics that prevent false or echo alert states.

To address the issue of echo alert states, the cusum statistic is reset to a predetermined value at the end of abnormal event, as shown in FIG. 7. According to embodiments, the predetermined value is zero. However, the reset value may be any desired value below the threshold.

Because the cusum statistic may vary up and down during an abnormal event determination, the end of the event can sometimes be difficult to ascertain. In one embodiment, determination of the end point of the abnormal event is calculated using a linear regression analysis. When a flat or downward trend is observed in the slope of the regression over the v previous cusum statistics, the abnormal event will be deemed to have ended. Each time the regression slope is positive, the starting index is increased by 1 (i.e., n=n+1) and another regression is calculated for v previous points until the slope is flat or negative. On the first occasion where the regression slope is negative, the end time of the event is determined to be the time in the set of the v that has the largest cusum value. The cusum value is reset for the timeslot corresponding the end of the event, the following cusum values are recomputed taking into account the reset cusum value.

For example, in FIG. 6, regression slopes are shown over the previous 7 cusum values (v=8). At time n=4, the problem begins. At time n=11, the problem is solved and normal behavior resumes. At time n=14, the regression slope becomes negative. Because 8 previous cusum statistics are used to calculate the regression value, the end time is represented by $\max\{S_n^+ : 7 \leq n \leq 14\}$. In the example shown in FIG. 6, the max $S_n^+$ occurs at n=11, which is therefore determined to be the end point of the event.

Referring again to FIG. 7, at time n=11, the cusum statistic is reset to zero. Thus, the variation in the cusum statistic occurring after n=11 falls within acceptable ranges of deviation from normal values. It will be observed that the exemplary cusum statistics $S_{16}^+$, $S_{17}^+$, and $S_{18}^+$ would trigger an alert state if the cusum statistic is not reset (see FIG. 6). However, when the cusum statistic is reset, $S_{16}^+$, $S_{17}^+$, and $S_{18}^+$ are well below the threshold and no alert state is triggered.

According to embodiments, the end point of abnormal events are recorded and the data is omitted from reinitialization procedures after the start time is determined.

Initiation Procedures

Figure 8:
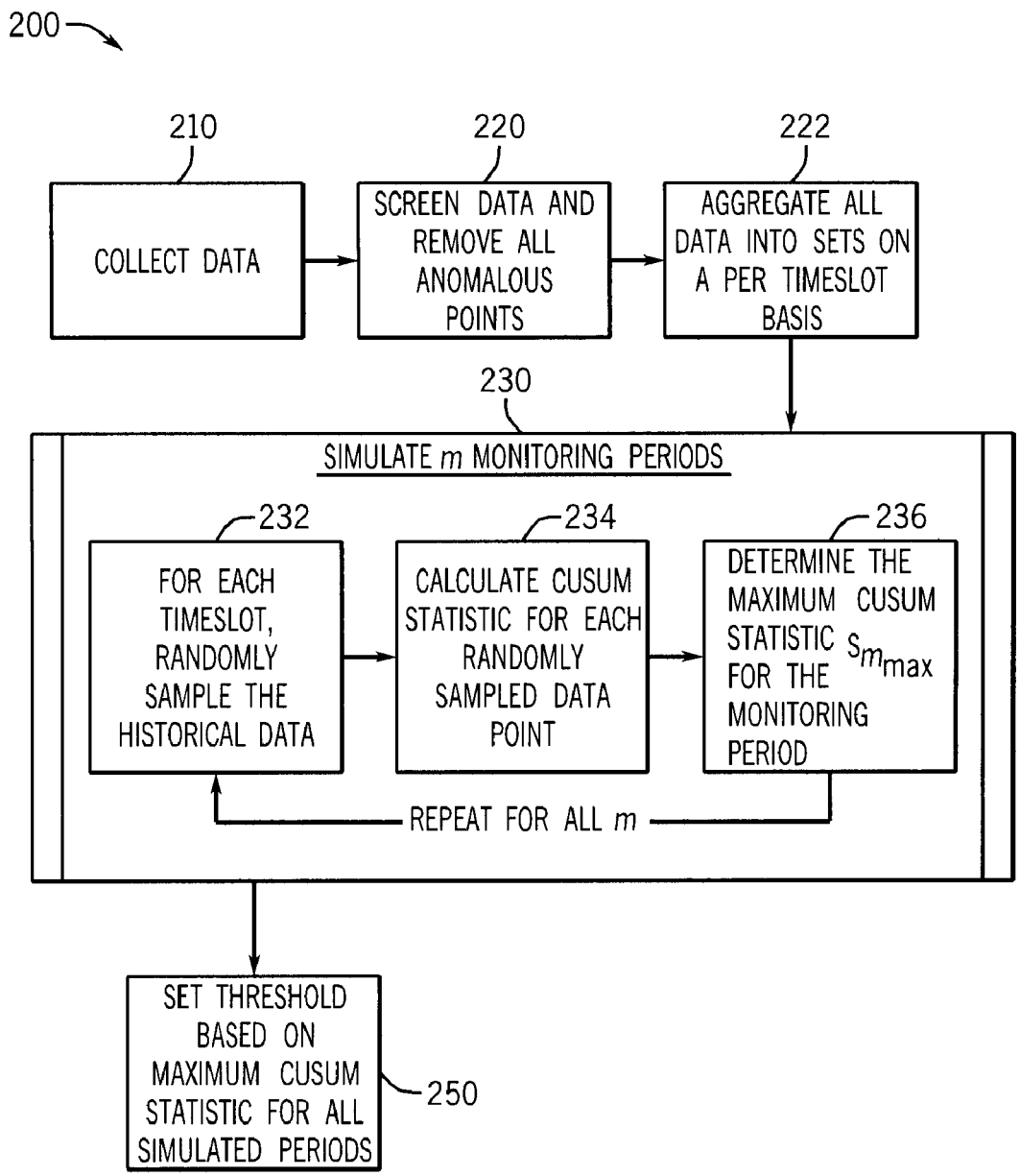
FIG. 8 is a flow chart illustrating an embodiment of the present disclosure of a method for initializing thresholds to which cusum statistics calculated from live date streams are compared.
Figure 9:
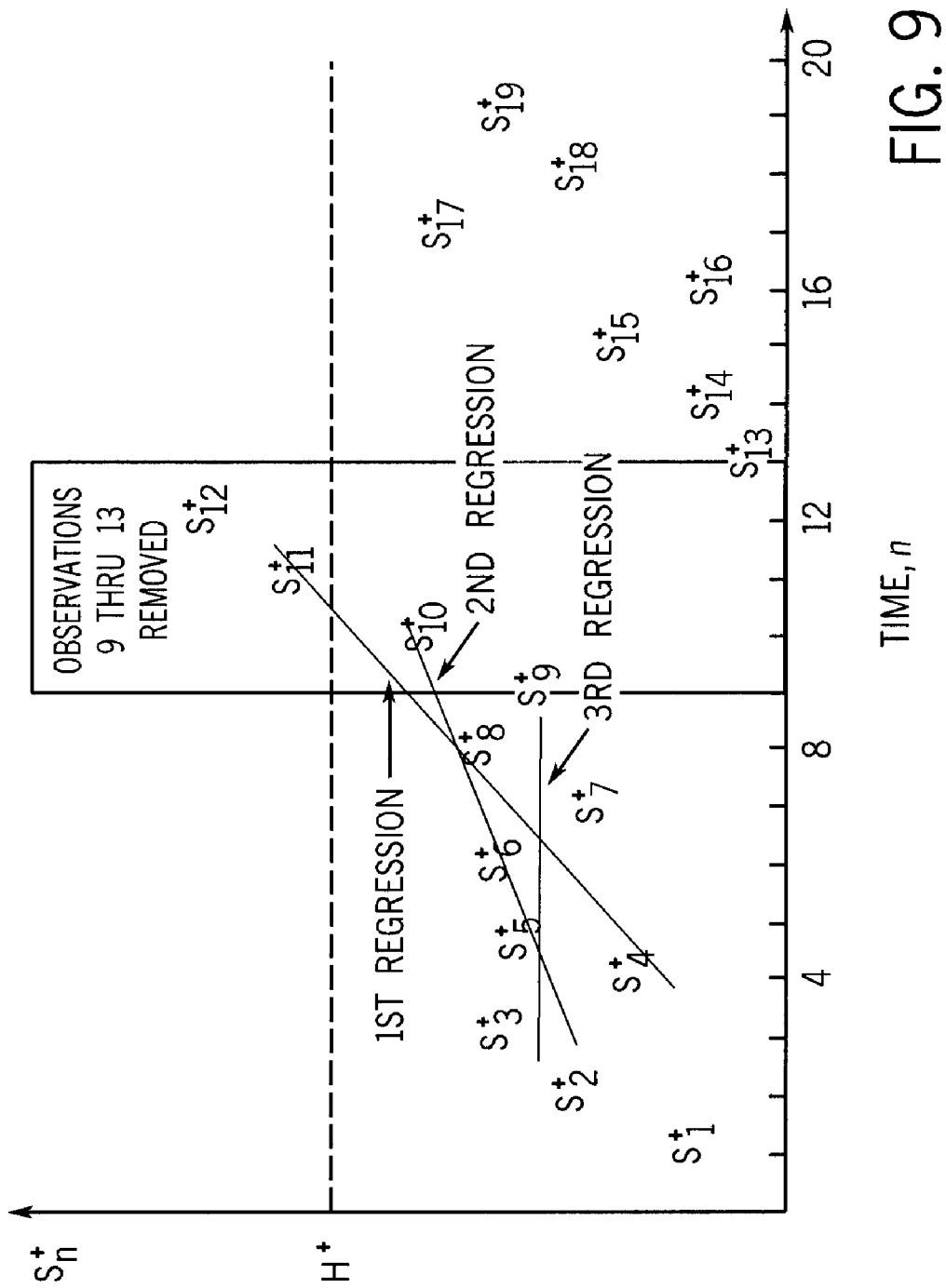
FIG. 9 is a graph illustrating an embodiment of the present disclosure of a procedure for determining the start point of an event using a regression analysis.

Initialization is the process by which thresholds and time specific values of α-percentile $Q_{\tau_n}(\alpha)$ and $Q_{\tau_n}(1-\alpha)$ are determined. In one embodiment, initialization in operation 200 is accomplished in a number of steps, as illustrated by FIG. 8. First, historical data is collected in operation 210, followed by screening the data and removing anomalous data point corresponding to abnormal events in operation 220. After all data is screened, the data corresponding to each timeslot for all historical periods is aggregated in operation 222. A series of m simulations are then executed in operation 230. Each simulation randomly samples the data for each timeslot in operation 232 and a cusum statistic is calculated for each randomly sampled data point in operation 234. Finally, for each simulation the largest cusum value for the entire monitoring period is stored in a set of maximum cusum values for all the monitoring periods in operation 236. The threshold set is a function of the largest cusum value selected from the set of maximum cusum values for all monitoring periods in operation 250. The entire process illustrated in FIG. 8 is carried out for each threshold. Artisans will recognize that implementation of the process described may comprise these steps in various different organization which are expressly contemplated herein.

The data collection 210 process is user definable. Generally, data is collected for a number of historical monitoring periods. The selection of the number of historical monitoring periods represents a balance between the confidence in the thresholds set and the ability to have the thresholds change as circumstances in a complex system change. For example, inclusion of a large number of historical monitoring periods in the calculation of a threshold, where the historical data is not weighted may result in a fairly static threshold. For example, taking three years of historical monitoring period data for airline reservation systems will prevent the thresholds from reflection seasonal variations in airline traffic unless a weighting system is used.

After collecting a number of monitoring periods of data in operation 210, the data must be screened for abnormal events in operation 220 that are non-representative of average, expected behavior from the complex system. During the initial initialization, the screening process must be completed for each monitoring period used in the initialization process. According to embodiments however, after the overall process is running, the screening will be completed as the monitoring period progresses and be saved for the ends of the monitoring period. (See FIG. 2, ref. #400, 420, and 440). For each monitoring period just ending, the process will automatically remove the abnormal events from the data pool, either in real-time or after the monitoring period ends, prior to the data for the monitoring period being used to update the thresholds together with the data of other historical monitoring periods, according to embodiments.

For historical data, the start point of abnormal events must be determined, as well as the end point. In one embodiment, the method for determining the end point of an event by regression analysis is disclosed previously and corresponds to the point where a cusum statistic is reset after an alert state is triggered. Similarly, and as illustrated in FIG. 8, regression analysis may be employed to determine a start point for abnormal events. However, unlike the regression calculations for the end point, the regression slopes are progressively calculated for v data points from the end point of the event in reverse chronological order until a negative or flat slope is determined. Thus, if an event is determined to end at n=11 and v=8, the slope of the cusum values from n=11 to n=4 is calculated, then the slope from n=10 to n=3 is calculated, followed by the slope from n=9 to n=2, and so forth until a negative or flat slope is observed. According to embodiments, the start time is determined to be the most recent cusum statistic in the set of v cusum values where the regression first has a flat or negative slope. That is, if the slot is determined to be negative or flat for cusum timeslots 9 to 2, then the start of the abnormal event is determined to be a time n=9 because it is the most recent timeslot.

Determination of the start point may be performed immediately after the reset procedure (see FIG. 2), and the data points corresponding to the abnormal event purged to the start of a new monitoring period. This avoids the necessity to research the historical data for anomalous events prior to each reinitialization procedure as all historical data was either screened in the initial initialization or during its monitoring period after an abnormal event was detected.

Referring still to FIG. 2 and according to embodiments, after a monitoring period ends, a secondary screening event is optionally performed to remove outliers that do not correspond to an abnormal event, but may represent non-average behavior such as large spikes and dips. Accordingly, the data may be windsorized with an arbitrary confidence interval for data on a timeslot by timeslot basis, which will remove outliers past a selected cutoff point. The confidence interval selected is a tunable parameter, according to embodiments, allowing users of the methods to modify the confidences and adjust which outliers are removed and which are retained in the historical data sets. Other methods of removing outliers are expressly contemplated as well. According to embodiments, the secondary screening step may also be performed as part of the screening in the initial initialization process.

Referring again to FIG. 8, after the data is collected in operation 210 and screened in operation 220, the data is aggregated into sets of timeslot data in operation 222. Each set of timeslot data will contain all of the data collected for that timeslot over each monitoring period. Naturally, each historical timeslot should generally correspond behaviorally with each of the other corresponding timeslots. Thus, for example, if the monitoring period is a week and the timeslot is that of Thursday nights from 2:00 AM-3:00 AM, the data from each historical Thursday night from 2:00 AM-3:00 AM will be aggregated into a set of data for that timeslot. Similarly, if the monitoring period is a month, the data for the timeslot defined by the $1^{st}$ of the month from 5:00 PM to 8:00 PM will be aggregated for all historical monitoring periods into a single set of historical data for that timeslot, for example. Because each timeslot may represent a plurality of metric observations, each observation is aggregated as a single data point into the set of data for the given timeslot.

According to embodiments, as each monitoring period ends and is appended to the set of historical data, the oldest monitoring period of data is removed from the set of historical data (see FIG. 2, reference No. 520). According to still other embodiments, the most recent historical data may be weighted to skew the applicable thresholds calculated in the reinitialization process to be more representative of more recent trends in the data.

Prior to initialization, $Q_{\tau_n}(\alpha)$ and $Q_{\tau_n}(1-\alpha)$ must be determined. According to an embodiment, $Q_{\tau_n}(\alpha)$ and $Q_{\tau_n}(1-\alpha)$ are determined for the initial initialization process using the raw historical data for the number of historical periods over which initialization is performed and determined on a timeslot by timeslot basis. According to embodiments, after each monitoring period is complete, $Q_{\tau_n}(\alpha)$ and $Q_{\tau_n}(1-\alpha)$ are updated using screened data prior to reinitialization.

After the data is aggregated in operation 222 on a timeslot by timeslot basis, q simulations are run in operation 230; q may be any value, such as 1000, as will produce a valid or useful threshold as an end product. According to embodiments, each simulation randomly selects data from the aggregated set of historical data for each timeslot in the same number of data observations as that data being observed in real-time in operation 232. Thus, if a metric returns 60 data observations per timeslot, the initialization procedure will sample with replacement 60 random data samples from the aggregated data for each timeslot. According to embodiments, the same data point within the set of historical data may be sampled more than once in a given monitoring period simulation. A sequence of randomly sampled historical data points from the historical data timeslot by timeslot for an entire simulated monitoring period is a path.

As the random sampling occurs, the generalized cusum algorithm is executed for each data point in the path, which generates a cusum statistic for each data point in the path in operation 234. After all the cusum statistics are determined in the path, the largest cusum value $\max\{S_n\}_q$ is determined in operation 236.

The simulation process is repeated q times to produce a set of q maximum cusum values $\{\max\{S_n\}_1, \max\{S_n\}_2, \ldots, \max\{S_n\}_q\}$. Recall that the threshold is a reflection of the maximum deviation away from normal behavior as dictated by the aggregated set of normal data, (as all anomalous data was removed in the screening step in operation 120). The threshold is set as some function of the maximum cusum for all simulations $f(\{\max\{S_n\}_1, \max\{S_n\}_2, \ldots, \max\{S_n\}_q\})$ in operation 250. According to embodiments, the threshold may be set to a given $\gamma$-percentile of the maximum cusum value, for example to the $99^{th}$ percentile.

The following examples illustrate subject matter areas having data behavior over time for which suitable metrics may be selected the present methods applied. Artisans will know and understand which metrics to apply the methods presented herein, and how to initiate root cause analysis when alert states are activated.

EXAMPLE 1

The principles and process described herein are applicable to data network monitoring. Network usage, open database sessions, etc., all provide examples of non-stationary data to which the methods of the present disclosure are applicable. For example, as shown in FIGS. 1, 4, and 5 and described herein, the present methods are applicable to database sessions, and by extension to other processes in and information technology setting from networks to software to hardware function.

For example, two metrics are collected from a server in a large data network. The metrics are the number of live user sessions and Oracle database sessions, which are sampled every, e.g., every 2 minutes and every 5 minutes, respectively. For both of these metrics, a two-sided generalized cusum algorithm is used to detect anomalous events, reflecting the fact that small as well as large values are indicative of degraded performance.

The cusum algorithm disclosed herein was implemented using a 12 week window of historical data. The windows for the regression test associated with determining the alert state reset point and the predicted event start time had a width v=8. The $\alpha$-quantile level was taken to be $\alpha=0.1$ and the $\gamma$-percentile was set to $\gamma=0.01$.

Following initial screening of the historical data in one embodiment, each of the metrics was monitored over several weeks using an automatic reset feature, a missing data feature, and a real-time screening feature for reinitialization of the thresholds of the cusum algorithm. FIGS. 4 and 5 are illustrative graphs corresponding to the second monitoring week of each metric. The information included in each graph is the raw data values (referenced by the right-hand scale), the generalized cusum tracking statistic (referenced by the left-hand scale), which for both metrics is $\max\{S_n^+, S_n^-\}$ and the two-sided generalized cusum threshold H.

FIG. 5 reveals no alert states for live user sessions, but FIG. 4 reveals an interesting alert state due to an event for Oracle sessions. The event began with an alert state triggered by $S_n^+>H$ at 10:38 a.m. on May 19. The predicted start time for the event is 9:53 a.m. which, when the raw data is examined on a finer scale, matches nicely with the beginning of observations that consistently exceed their expected 90th percentile. The cusum statistic resets itself at 2:03 p.m., reflecting what possibly could have been an attempt to fix the problem. However, at that same time the observations in the raw data begin to be consistently smaller than their expected 10th percentile, and at 3:48 p.m. the cusum again triggers an alert state, but this time due to $S_n^->H$. At 4:53 p.m. the server stops reporting data for about a 10 hour period and this is reflected by the horizontal portion of the cusum graph.

Because the described illustration is a retrospective analysis of historical data, an exact explanation of what occurred during this period is not known. However, an informed conjecture is that the initial $S_n^+$ alert state signaled a degrading failure condition of an Oracle database, the reset of $S_n^+$ coincided with an initial maintenance action where existing sessions were drained, the subsequent $S_n^-$ alert state reflected relative inactivity during the draining period, and the missing data period was the result of the Oracle database being offline during the repair.

FIG. 10 summarizes the number of observed alert states for both metrics across the entire monitoring period. Live user sessions was monitored for 9 weeks and Oracle sessions was monitored for 14 weeks. Columns 4 and 5 report the minimum and maximum values H during across all of the monitoring periods. Column 6 reports the total number of alert states found during all of the monitoring periods. Column 7 reports the average duration of the alert states over all of the monitoring periods, measuring duration both by the number of observations as well as elapsed time. Finally, column 8 reports the average time to detect the alert states, also in terms of number of observations and elapsed time.

From FIG. 10, it is readily observed that there is significant variability in H that results from underlying network churn. The total number of alert states across both metrics is 40, which implies an average of 1.7 alert states per week that are being seen by technicians. For both metrics the average detect time is on the order of one hour and the average duration of an alert state is on the order of 3-4 hours. While the one year-old retrospective context of this analysis prohibits knowing which, if any, of the alert states reported in these monitoring periods are false positive or false negative alert states, there is nothing unusual about the statistics reported in FIG. 10.

For example, the only on-line computation associated with the generalized cusum algorithm that takes significant time is the evaluation of H for each monitoring period. In a large-scale implementation of the algorithm, this computation demand arises once each monitoring period for each data stream. According to embodiments based on testing, it is possible to handle the computing demand associated with the generalized cusum for well over 2,000 data streams using a single processor.

EXAMPLE 2

The methods presented herein are also applicable, as alluded to, to the airline industry. As the seats on a given flight are purchased, flight prices fluctuate in an attempt to sell out all the seats at the highest price per seat. The methods herein provide a monitoring solution that allows airlines to determine when the number of seats sold at a given time period before a flight constitutes anomalies, or whether the number of seats sold is within an acceptable level of deviation. As anomalies are detected, airlines may adjust ticket prices to correct for each anomaly. In effect, the methods of the present disclosure allow airlines to more accurately gauge the market conditions and set prices accordingly.

EXAMPLE 3

Similarly, the methods presented herein are applicable to the travel lodging industry as well. As with airlines, hotels seek to have as many rooms sold as possible for the highest price possible. However, if prices are set too high, the rooms may not sell out; conversely, if the price is set too low, the rooms may sell out but do not maximize the profit that could have otherwise been earned if the room prices had been higher. By monitoring deviations from normal values, hotels can determine when the prices are too low and when the prices are too high to ensure selling the maximum number of rooms for the maximum profit.

EXAMPLE 4

The methods presented herein may be applied generally to the sports industry, as well. For example, baseball players tend to have hitting streaks and slumps. During the slumps, the player has often made a mechanical change to their batting approach that results in a hitting slump, typically marked by an above average number of ground balls and pop-fly outs. The methods disclosed herein may be applied to the at bats of a baseball player to isolate slumps and to give coaches an idea of when a mechanical change first occurred to isolate the issue in the swing. Moreover, as a manager becomes confident a hitter is emerging from a slump, the lineup may be adjusted accordingly. Artisans will recognize the broad applicability of the present methods in the sporting world.

EXAMPLE 5

Traffic patterns are yet another area wherein the methods presented herein are applicable. Traffic, especially freeway traffic, tends to be non-stationary. Traffic generally is heavier during the day than in the evening and nights. Additionally, during the rush hours, traffic becomes even more congested. The present methods provide a means whereby traffic patterns may be analyzed and root causes explored for anomalous events occurring within those patterns leading to traffic slow-downs, etc.

The process described above can be stored in a memory of a computer system as a set of instructions to be executed. In addition, the instructions to perform the processes described above could alternatively be stored on other forms of machine-readable media, including magnetic and optical disks and related media. For example the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer or machine readable media, such as discrete hardware components as large-scale integrated circuits (LSI's), application-specific integrated circuits (ASIC's), firmware such as electrically erasable programmable read-only memory (EEPROM's); and electrical, optical, acoustical, and other forms of propagated signals (e.g., carrier waves, infrared signals, digital signals, etc.).

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for determining the end point of an anomalous event in an information technology (IT) infrastructure comprising:
on a computer, measuring and collecting data for a metric in the IT infrastructure;
obtaining a cusum value for the metric over a series of time periods;
obtaining a linear regression of cusum values for a set of v time periods, wherein if the slope of linear regression is positive, increasing v by w (v=v+w), where w is an integer, and obtaining a new linear regression for the new set of v time periods and repeating until the regression slope is negative;
designating a time period in the set of v historical cusum values in which the regression slope is negative as the end point of the anomalous event; and
when the anomalous event is detected using the cusum values, initiating an alert state that effects at least one response to address at least one condition triggering the anomalous event in an affected component of the IT infrastructure, the designated end point of the anomalous event being used for reset to avoid subsequent false alert states,
wherein regressions over v cusum values begins at the first cusum statistic to exceed the threshold and progresses for each cusum statistic thereafter until a negative or flat slope is calculated.

2. The method of claim 1, wherein the end point is designated as the time period corresponding to a largest cusum value in the set of v historical cusum values.

3. The method of claim 2, wherein the cusum value is reset to zero.

4. The method of claim 1, further comprising resetting the cusum value at the time period when the anomalous event is determined to be ended.

5. A non-transitory computer medium containing computer instructions stored therein for causing a computer processor to perform a method for determining the end point of an anomalous event in an information technology (IT) infrastructure comprising:
on a computer, measuring and collecting data for a metric in the IT infrastructure;
obtaining a cusum value for the metric over a series of time periods;
obtaining a linear regression of cusum values for a set of v time periods, wherein if the slope of linear regression is positive, increasing v by w (v=v+w), where w is an integer, and obtaining a new linear regression for the new set of v time periods and repeating until the regression slope is negative;
designating a time period in the set of v historical cusum values in which the regression slope is negative as the end point of the anomalous event; and
when the anomalous event is detected using the cusum values, initiating an alert state that effects at least one response to address at least one condition triggering the anomalous event in an affected component of the IT infrastructure, the designated end point of the anomalous event being used for reset to avoid subsequent false alert states,
wherein regressions over v cusum values begins at the first cusum statistic to exceed the threshold and progresses for each cusum statistic thereafter until a negative or flat slope is calculated.

6. The non-transitory computer medium of claim 5, wherein the end point is designated as a time period corresponding to the largest cusum value in the set of v historical cusum values.

7. The non-transitory computer medium of claim 6, wherein the cusum value is reset to zero.

8. The non-transitory computer medium of claim 5, further comprising resetting the cusum value at the time period when the anomalous event is determined to be ended.

9. A method for determining the start point of an anomalous event in an information technology (IT) infrastructure comprising:
- on a computer, measuring and collecting data for a metric in the IT infrastructure;
- obtaining a cusum value for the metric over a series of time periods;
- determining an end point for the anomalous event;
- obtaining a linear regression for a set of v time periods corresponding with the end point of the anomalous event and the v−1 time periods prior to the time period corresponding with the end point;
- if the slope of linear regression is positive, decreasing v by w (v=v−w), where w is an integer, and obtaining a linear regression for the new time interval and repeating until the regression slope is negative;
- when the regression slope is negative, assigning one of the time periods in the v time periods to be the starting point of the anomalous event; and
- when the anomalous event is detected using the cusum value, initiating an alert state that effects at least one response to address at least one condition triggering the anomalous event in an affected component of the IT infrastructure, the assigned start point of the anomalous event being used to determine a threshold to detect a subsequent anomalous event.

10. The method of claim 9, further comprising outputting the time period corresponding to the start point of the anomalous event.

11. The method of claim 9, wherein the time period assigned as the starting point of the anomalous event comprises the most recent time period in the set of time periods from which the linear regression having the negative slope is calculated.

12. The method of claim 9, wherein determination of the end point for the anomalous event comprises:
- obtaining another linear regression of cusum values for another set of v time periods,
- wherein if the slope of the another linear regression is positive, increasing v by w (v=v+w) and obtaining a new linear regression for the new set of v time periods and repeating until the regression slope is negative; and
- designating a time period in the set of v historical cusum values in which the regression slope is negative as the end point of the anomalous event,
- wherein regressions over v cusum values begins at the first cusum statistic to exceed the threshold and progresses for each cusum statistic thereafter until a negative or flat slope is calculated.

13. The method of claim 12, wherein the end point is designated as the time period corresponding to a largest cusum value in the set of v historical cusum values.

14. The method of claim 12, further comprising purging the data points corresponding to the anomalous event from the collected metric data.

15. A non-transitory computer medium containing computer instructions stored therein for causing a computer processor to perform a method for determining the start point of an anomalous event in an information technology (IT) infrastructure comprising:
- on a computer, measuring and collecting data for a metric in the IT infrastructure;
- obtaining a cusum value for the metric over a series of time periods;
- determining an end point for the anomalous event;
- obtaining a linear regression for a set of v time periods corresponding with the end point of the anomalous event and the v−1 time periods prior to the time period corresponding with the end point;
- if the slope of linear regression is positive, decreasing v by w (v=v−w), where w is an integer, and obtaining a linear regression for the new time interval and repeating until the regression slope is negative;
- when the regression slope is negative, assigning one of the time periods in the v time periods to be the starting point of the anomalous event; and
- when the anomalous event is detected using the cusum value, initiating an alert state that effects at least one response to address at least one condition triggering the anomalous event in an affected component of the IT infrastructure, the assigned start point of the anomalous event being used to determine a threshold to detect a subsequent anomalous event.

16. The non-transitory computer medium of claim 15, further comprising outputting the time period corresponding to the start point of the anomalous event.

17. The non-transitory computer medium of claim 15, wherein the time period assigned as the starting point of the anomalous event comprises the most recent time period in the set of time periods from which the linear regression having the negative slope is calculated.

18. The non-transitory computer medium of claim 15, wherein determination of the end point for the anomalous event comprises:
- obtaining another linear regression of cusum values for another set of v time periods, wherein if the slope of the another linear regression is positive, increasing v by w (v=v+w) and obtaining a new linear regression for the new set of v time periods and repeating until the regression slope is negative; and
- designating a time period in the set of v historical cusum values in which the regression slope is negative as the end point of the anomalous event,
- wherein regressions over v cusum values begins at the first cusum statistic to exceed the threshold and progresses for each cusum statistic thereafter until a negative or flat slope is calculated.

19. The non-transitory computer medium of claim 18, wherein the end point is designated as the time period corresponding to a largest cusum value in the set of v historical cusum values.

20. The non-transitory computer medium of claim 18, further comprising purging the data points corresponding to the anomalous event from the collected metric data.

* * * * *